Figure 1:
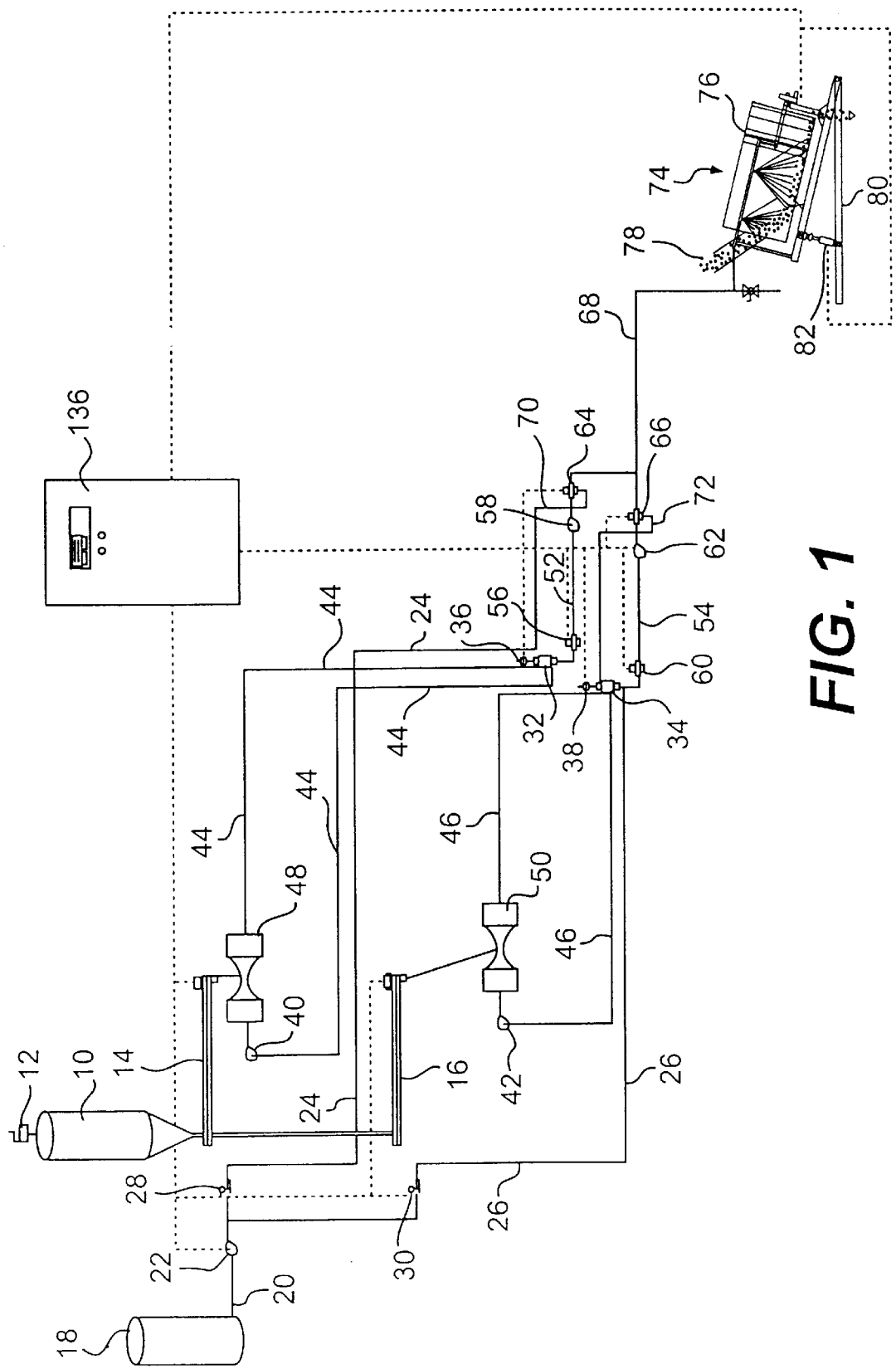

United States Patent [19]

Jefferson et al.

[11] Patent Number: 6,056,822
[45] Date of Patent: May 2, 2000

[54] PROCESS AND SYSTEM FOR COATING A FEED COMPOSITION WITH A FEED ADDITIVE

[75] Inventors: Wayne A. Jefferson, Simpsonville; Alan M. Kapp, Greer, both of S.C.

[73] Assignee: Liquid Systems, Inc., Simpsonville, S.C.

[21] Appl. No.: 09/174,085

[22] Filed: Oct. 16, 1998

Related U.S. Application Data

[63] Continuation-in-part of application No. 08/892,072, Jul. 14, 1997, abandoned.

[60] Provisional application No. 60/035,443, Jan. 30, 1997.

[51] Int. Cl.⁷ .................................................. B05C 5/00
[52] U.S. Cl. .......................... 118/683; 118/19; 118/23; 118/24; 118/612; 118/320; 99/516; 99/534; 239/302; 239/306; 239/310; 366/177.1
[58] Field of Search .................. 118/683, 429, 118/19, 23, 24, 320, 418, 612; 99/516, 534; 222/145.1, 145.7, 145.8; 239/302, 303, 306, 310; 426/72, 302, 623, 635, 805; 366/177.1, 141, 151.1, 155.1, 169.1, 154.1

[56] References Cited

U.S. PATENT DOCUMENTS

| | | | |
|---|---|---|---|
| 3,101,040 | 8/1963 | Lanz ................................. | 118/19 |
| 3,263,592 | 8/1966 | Hickey et al. ...................... | 118/19 |
| 3,822,056 | 7/1974 | Hawes, Jr. et al. ................. | 366/114 |
| 4,018,426 | 4/1977 | Mertz et al. ...................... | 366/177.1 |
| 4,168,674 | 9/1979 | Futter .............................. | 118/19 |
| 4,183,675 | 1/1980 | Zarow .............................. | 99/516 |
| 4,846,053 | 7/1989 | Lane et al. ........................ | 99/339 |
| 5,100,699 | 3/1992 | Roeser .............................. | 118/612 |
| 5,135,174 | 8/1992 | Chaplinsky ........................ | 239/310 |
| 5,194,275 | 3/1993 | Greer .............................. | 99/516 |
| 5,332,311 | 7/1994 | Volk, Jr. et al. .................. | 366/177.1 |

OTHER PUBLICATIONS

Terry Stemler; "Extending Feed Processing Past The Pellet Mill", Feed Management, vol. 45, No. 7, Jul. 1994.

Feed Mix vol. 5 no. 5 1997, Choosing A Liquid Enzyme System, pp. 24–27.

Feed Tech vol. 2, No. 3, Liquid Addition Of Sensitive Additives, pp. 11–12.

Application of Liquid Enzymes In Poultry Feeds, by Dr. A.J.Harker, Finnfeeds International Ltd, 5 pages.

(List continued on next page.)

*Primary Examiner*—Laura Edwards
*Attorney, Agent, or Firm*—Dority & Manning, P.A.

[57] ABSTRACT

The present invention is generally directed to various systems and processes for applying feed additives to a solid feed composition. In one embodiment, a solid feed additive is combined with a liquid carrier to form a feed additive suspension. The feed additive suspension is fed to a dispensing device that sprays the suspension onto a solid feed composition stream. In an alternative embodiment, a system is disclosed that combines and/or dilutes various liquid feed additives that are then similarly sprayed on a solid feed composition stream. In various embodiments of the present invention, the system includes a plurality of submixing systems that not only maintain a homogeneous suspension or solution but are also capable of continuously applying the solution or suspension to the feed composition.

35 Claims, 11 Drawing Sheets

OTHER PUBLICATIONS

Reprint from Feed Mangement, Jun. 1996, Enhancing The Nutritive Value of Wheat and Barley For Poultry and Swine Feeds: Enzymes To The Rescue, by Craig Wyatt, PhD and Hadden Graham, PhD.

Enzymes & Processing, The Effects and Interaction of Enzymes and Hydrothermal Pre–treatments and Their Contribution To Feeding Value, by Vesa Nissinen, Finnfeeds International Ltd, United Kingdom.

World Poultry–Misset, vol. 11, No. 4, 1995 Enzymes' Role In Nutrition, 4 pages.

Porzyme SF100, Finnfeeds International Limited, The Finishing Pig and Feed Enzymes, by Andrew Harker, Finnfeeds International Ltd. 1 page.

International Milling Flour & Feed, Jan. 1994, Process Control, pp. 34, 35.

Feed Mangement, Aug. 1996, vol. 47, No. 8, New Technology In The Application Of Microingredients: Thixotropic Gel Premixes, by Dr. Ulf Abele, pp. 29–30.

Feedstuffs, Sep. 29, 1997, Mill Technology, by Doug Fodge, Andy Smith, Curtis Redman, Humg–Yu Hsiao and Bernie Treidl, pp. 18–26.

PROCESS AND SYSTEM FOR COATING A FEED COMPOSITION WITH A FEED ADDITIVE

The present application is a continuation in part of Ser. No. 08/892,072 filed Jul. 14, 1997, now abandoned which is based on a Provisional Application having U.S. Ser. No. 60/035,443, filed Jan. 30, 1997.

FIELD OF THE INVENTION

The present invention generally relates to a process and to a system for coating a feed composition with feed additives. More particularly, the present invention is directed to a system in which a liquid suspension containing a feed additive is applied to feed pellets and to a system for diluting and applying liquid additives to feed pellets. The additives can be, for instance, feed supplements, vitamins, enzymes, antioxidants, flavorants, and the like.

BACKGROUND OF THE INVENTION

Animal feedstuffs used to feed, for instance, poultry, cattle, and swine, are generally made from grains, including wheat, barley, and corn. In producing the feed, the raw ingredients are typically mixed together and milled to a particular size. The granulated stock is then subjected to various process steps in producing a pelletized feed. In particular, during production of the feed pellets, the raw ingredients are cooked and exposed to high temperatures.

In some applications, once the feed pellets or feed granules are formed, it is desirable to add other various additives to the feed. For instance, these additives may include diet supplements, such as vitamins and flavorants, additives that aid in the digestion of the feed, such as enzymes or additives that are beneficial to the environment by reducing elements that are accumulating in the soil. Unfortunately, many feed additives cannot be added during production of the feed because of their sensitivity to higher temperatures and other process conditions. Thus, many additives must be combined with the feed after the feed pellets or feed granules are formed.

Common additives that are applied to animal feeds can be either liquids or solids. When the additive is in solid form, the additive is typically combined with a liquid and the resulting suspension is applied to the feed material. Various problems exist, however, in preventing the additive from settling in the suspension, in handling the suspension, and in applying the suspension uniformly to the feed material. Also, problems have been encountered in selecting a proper liquid carrier for the solid additive.

When the additive is in liquid form, the additive can be applied directly to the feed composition. In some systems, however, the liquid additive is diluted and possibly combined with other liquid additives before being applied to the animal feed.

The present invention is generally directed to improved additive handling systems for applying solid and liquid additives to a feed composition. The systems of the present invention are adapted to apply additives continuously and uniformly to the feed. Other advantages and benefits will be described or will be made apparent from the following description.

SUMMARY OF THE INVENTION

The present invention is directed to various improvements in processes and systems for applying additives to a feed composition.

Accordingly, it is an object to the present invention to provide an improved system and process for applying a liquid suspension to a feed composition.

It is another object to the present invention to provide a processing system for forming a liquid suspension and for preventing solid particles in the suspension from settling prior to application.

Another object to the present invention is to provide a processing system for uniformly applying a liquid suspension to a feed composition.

It is another object to the present invention to provide an improved processing system for applying liquid additives to a feed composition.

Another object to the present invention is to provide a processing system for diluting liquid additives, mixing together different liquid additives, and uniformly applying the mixture to a feed composition.

Still another object to the present invention is to provide continuous systems for applying additives to an animal feed composition.

These and other objects to the present invention are achieved by providing a system for applying a suspension containing a solid feed additive to a feed composition. The system includes a solid additive reservoir and a liquid carrier reservoir for containing and supplying a solid feed additive and a liquid carrier respectively to the system. The solid additive reservoir and the liquid carrier reservoir are in communication with at least a first mixing subsystem and a second mixing subsystem. Each of the mixing subsystems are designed to receive preselected amounts of the solid additive and the liquid carrier and to mix the solid additive and liquid carrier into a suspension for application to a feed composition.

More particularly, the system includes at least two separate mixing subsystems so that a first liquid carrier and solid additive suspension can be dispensed while a second liquid carrier and solid additive suspension is mixing. In this manner, a continuous flow of the suspension can be fed to a dispensing device.

Each of the mixing subsystems can include a mixing conduit or pipe configured to circulate the suspension to and from a holding tank. In order to circulate the suspension, the mixing pipe can be in communication with a pump. In order to mix the liquid carrier and the solid additive, the mixing pipe also contains a mixing device. For instance, in one embodiment, the mixing pipe can be connected to a eductor where the solid additive and liquid carrier are combined.

In order to measure the amounts of the liquid carrier and solid additive fed to each mixing subsystem, the system can include load cells at different locations. For instance, in one embodiment, a load cell can be placed at the solid additive reservoir for measuring the amount of solid additive leaving the reservoir. In order to measure the amount of liquid carrier, the liquid carrier can be fed to each holding tank, which can be equipped with a load cell.

Once a suspension is formed, the mixing subsystems deliver the suspension to a dispensing device. The dispensing device includes a plurality of nozzles that convert the suspension into a spray which is directed onto a feed composition. In one embodiment, the nozzles can combine air with the suspension in order to form a spray. In order to prevent clogging, the nozzles each can include a nozzle cleaning device. For instance, each nozzle can be equipped with a retractable needle which is forced through the nozzle a periodic intervals.

The solid additive and liquid carrier suspension can be applied to the feed composition in a design spray chamber or rotating drum. The drum rotates in order to promote mixing between the suspension and the feed composition. Of particular advantage, the rotating drum spray device lowers liquid holdup in the vessel, lowers fines due to the pellets falling apart, and promotes uniform coverage of the additive on the pellets. The drum can be positioned at an angle so that the feed composition flows through the drum due to the force of gravity. The drum can also include a load cell for monitoring the flow rate of the feed composition through the drum.

These and other objects of the present invention are also achieved by providing a system for diluting, combining and applying liquid feed additives to a feed composition. The system is configured to feed a dilution agent and one or more liquid additives to at least two mixing subsystems. As described above, two or more mixing subsystems are configured to combine the liquid ingredients and to apply them continuously to a feed composition.

In this system, preferably each mixing subsystem includes a mixing tank where a dilution agent and at least one liquid additive are combined and mixed. Each mixing tank can contain a load cell for measuring the amounts of the ingredients fed to the tank.

Once the dilution agent and at least one liquid additive are combined, the resulting solution is converted into a spray and applied to a feed composition.

Other objects, features, and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference the accompanying figures, in which:

FIG. 1 is a plan view of a system made in accordance with the present invention that is designed to form a suspension and apply the suspension to a feed composition;

FIG. 2 is a plan view of one embodiment of nozzles used in the system of FIG. 1;

FIG. 3 is a side view of a rotating drum used in the system illustrated in FIG. 1;

FIG. 4 is a cross sectional view of the rotating drum illustrated in FIG. 3;

FIG. 5 is a side view of one embodiment of a nozzle that may be used in the systems of the present invention;

FIG. 6 is another embodiment of a nozzle that may be used in the systems of the present invention;

FIG. 7 is a plan view of another embodiment of a system made in accordance with the present invention that is designed to form a suspension and apply the suspension to a feed composition;

FIG. 8 is a plan view of a further embodiment of a system made in accordance with the present invention that is designed to form a suspension and apply the suspension to a feed composition;

FIG. 9 is a plan view of a system made in accordance with the present invention for applying liquid additives to a feed composition;

FIG. 10 is a side view of a mixing device that may be used in the systems of the present invention;

FIG. 11 is a top view of the mixing device illustrated in FIG. 10;

FIG. 12 is a plan view of another embodiment of a system made in accordance with the present invention for applying liquid additives to a feed composition;

FIG. 13 is a plan view of a further embodiment of a system made in accordance with the present invention for applying liquid additives to a feed composition; and FIG. 14 is a plan view of a further alternative embodiment of a system made in accordance with the present invention for applying liquid additives to a feed composition; and FIG. 15 is a cross-sectional view of a connecting device that may be used in the system illustrated in FIG. 14.

Repeat use of reference characters in the present specification and drawings is intended to represent same or analogous features of elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

In general, the present invention is directed to various systems and processes for applying additives to animal feed compositions. The systems are for the accurate, controlled application of, for instance, concentrates, vitamins, enzymes, flavorants, and other feed additives onto a feed composition for the beneficial health and growth of livestock, including swine, cattle, and poultry. According to the present invention, a system is provided for applying a solid feed additive to a feed composition and to a system for applying a liquid additive to a feed composition.

One embodiment of a system made in accordance with the present invention for applying a solid additive to a feed composition is illustrated in FIG. 1. More particularly, the system is for combining a solid additive with a liquid carrier to form a suspension, for preventing the solid additive from settling in the suspension, and for uniformly applying the suspension to a feed composition. A liquid carrier is combined with the solid additive in order to facilitate the application and transportation of the additive.

Referring to FIG. 1, the system includes a dry storage reservoir 10 adapted to contain a solid feed additive, such as a powder. Reservoir 10 is in operative association with a load cell 12, a first feed auger 14 and a second feed auger 16. Load cell 12 is adapted to monitor weight changes in reservoir 10 when the additive is dispensed from the reservoir via feed augers 14 and 16. Thus, through the use of load cell 12, the amount of the additive fed to the system can be monitored and determined.

The system also includes a liquid reservoir 18 adapted to hold a liquid carrier to be mixed with the solid additive. The liquid carrier used in the process of the present invention will depend, for the most part, on the solid additive to be combined with the feed composition. In most applications, however, the liquid carrier will either be water or an organic liquid, such as an animal fat or a vegetable oil. In one preferred embodiment soybean oil is used. If a vegetable oil or a fatty oil is used, it may be necessary to heat the liquid carrier in order to decrease the viscosity. In this regard, when necessary, liquid reservoir 18 can be equipped with a heater in order to heat the liquid carrier and the lines will be heat traced and insulated.

The liquid carrier is dispensed from the liquid reservoir 18 through a pipe 20 by using a pump 22. Pipe 20, in this embodiment, branches off into a first liquid feed pipe 24 and a second liquid feed pipe 26. Entry of the liquid carrier into feed pipes 24 and 26 are controlled by a pair of respective flow control devices, such as solenoid valves 28 and 30, respectively.

As shown in FIG. 1, the solid additive is introduced into the system either through first feed auger 14 or second feed auger 16, while the liquid carrier is introduced into the system either through first liquid feed pipe 24 or second liquid feed pipe 26. More particularly, the liquid carrier fed to the system through first liquid feed pipe 24 is ultimately mixed with the solid additive fed through first feed auger 14. Likewise, the liquid carrier fed to the system through second liquid feed pipe 26 is ultimately mixed with the feed additive fed to the system through second feed auger 16. In this manner, the system includes two separate and distinct mixing sub-systems. As will be described in more detail below, by using two separate sub-systems, the feed additive and liquid carrier suspension can be fed continuously to the feed composition. Specifically, the system of the present invention is configured to mix and create a feed additive and a liquid carrier suspension while at the same time dispensing an already formed feed additive suspension.

In order to measure the amount of liquid carrier mixed with the dry additive, the liquid carrier is pumped via liquid feed pipes 24 and 26 into a first holding tank 32 and a second holding tank 34, respectively. Holding tank 32 is in operative association with a first load cell 36, while second holding tank 34 is in operative association with a load cell 38. Load cells 36 and 38 monitor weight differences in holding tanks 32 and 34 for determining the amount of liquid carrier added to the system.

Once the desired amount of liquid carrier is fed to the system through holding tanks 32 and 34, the liquid is then pumped by pumps 40 and 42 into mixing pipes 44 and 46, respectively. As shown, mixing pipe 44 is in communication with a mixing device, such as an eductor 48, while mixing pipe 46 is in communication with an eductor 50. Eductors 48 and 50 are also in communication with corresponding feed augers 14 and 16 for receiving the solid additive. Specifically, as the liquid carrier is circulated through mixing pipes 44 and 46, eductors 48 and 50 mix the liquid carrier with the solid additive to form a homogeneous liquid suspension.

Besides eductors 48 and 50, other mixing devices may be used in the system of the present invention to form the suspension. For instance, in an alternative embodiment, the liquid carrier and the solid additive may be fed to separate mixing tanks which blend the mixture and prevent settling. Of course, other mixing devices and systems may also be used.

Once formed, the solid additive and liquid carrier suspension is dispensed from holding tanks 32 and 34 via dispensing lines 52 and 54, respectively. More particularly, solenoid valve 56 and pump 58 are used to dispense the suspension from holding tank 32, while a solenoid valve 60 and a pump 62 are used to dispense the suspension from holding tank 34.

As shown, dispensing line 52 is in communication with a three-way solenoid valve 64, while dispensing line 54 is in communication with a three-way solenoid valve 66. From dispensing line 52, three-way solenoid valve 64 is configured to direct the flow of the suspension either into a common effluent 68 or into a recirculation line 70. Similarly, three-way solenoid valve 66 also is configured to direct the suspension into common effluent 68 or into a second recirculation line 72. Recirculation lines 70 and 72 are in communication with corresponding holding tanks 32 and 34 and are included within the system to prevent settling of the solid additive once the suspension is formed but prior to application to the feed composition.

Figure 3:
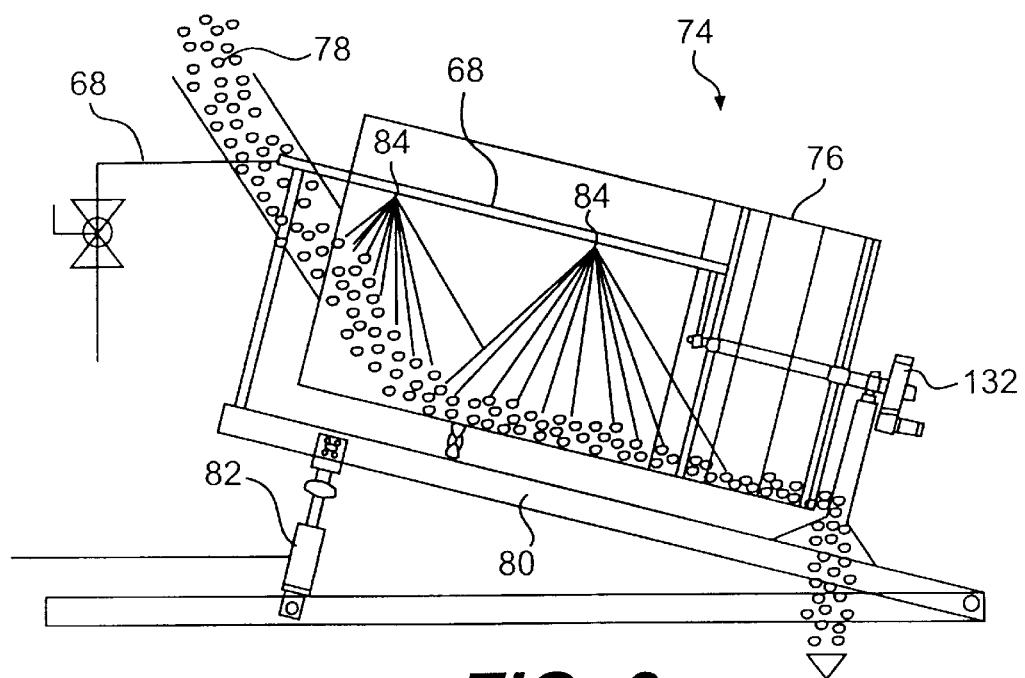

Once the suspension containing the liquid carrier and the solid additive is formed and thoroughly mixed, the suspension is directed into common effluent 68 and fed to a dispensing device generally 74, which is more particularly illustrated in FIG. 3. As shown in FIG. 3, dispensing device 74 includes a rotating drum 76 adapted to receive a continuous flow of a feed composition 78. Feed composition 78 can be, for instance, in the form of feed pellets or feed granules and can be fed to rotating drum 76 from a feed hopper, from a conveyor, or by any suitable means.

As shown in the embodiment illustrated in FIG. 3, rotating drum 76 is positioned at an angle relative to the horizon on a platform 80. In this arrangement, feed composition 78 can be gravity fed through the rotating drum. The angle at which the drum is positioned and the length of the drum determines the residence time of feed composition 78 within dispensing device 74. In most applications, drum 76 should be set at an angle from about 3° to about 30°, and particularly from about 15° to about 30°, relative to the horizon. For most applications, the feed composition should remain within dispensing device 74 from about 4 seconds to about 12 seconds, and particularly for about 10 seconds.

Besides using an angled drum, however, other conveyor type devices may also be used according to the present invention in order to pass the feed composition through dispensing device 74. For instance, in an alternative embodiment, drum 76 can be equipped with a screw conveyor. A gravity feed system, however, is more economical.

In order to determine the flow rate of feed composition 78 through rotating drum 76, dispensing device 74 includes a load cell 82. Load cell 82 monitors the weight of feed composition 78 within rotating drum 76, which can then be used for determining the flow rate of the feed composition. Specifically, the angle of the rotating drum indicates the length of time the feed composition will remain in the drum. The weight data generated by the load cell in combination with the resonance time as indicated by the angle of the drum allows flow rates to be calculated.

As feed composition 78 enters rotating drum 76, it is coated with the solid feed additive and liquid carrier suspension. Specifically, the mixed suspension is directed through common effluent 68 into a plurality of nozzles 84, which atomize the slurry into droplets and apply them to the feed composition.

Figure 2:
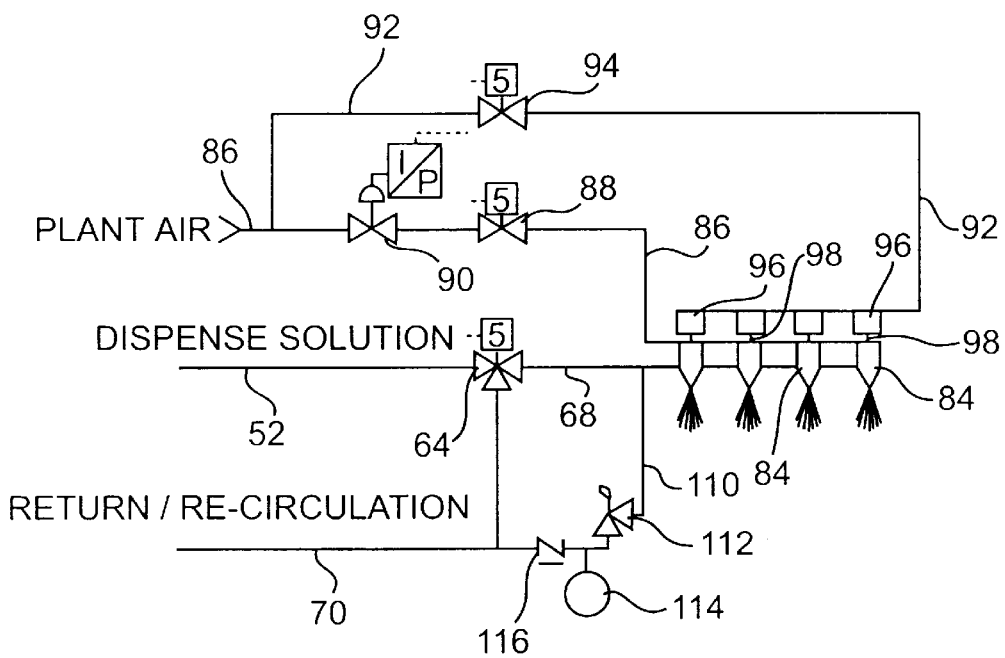

One embodiment of a plurality of nozzles 84 that may be used in the system of the present invention is illustrated in FIG. 2. As shown in FIG. 2, nozzles 84 combine a gas, such as air, received from an air line 86 with the feed additive and liquid carrier suspension in order to atomize the suspension. Air line 86 can optionally include a solenoid valve 88 for turning the air flow on and off and a control valve 90 for adjusting the air pressure within line 86. For instance, a control valve can be used to control the atomization air flow as the solids rate changes.

In general, the additive and liquid carrier suspension should be atomized to a droplet size as large as possible to prevent clogging of nozzles 84 and to lower air flow rates and energy requirements. Smaller droplet sizes, however, lead to more uniform application of the suspension on the feed composition. Nozzles 84 should be configured to create droplet sizes well suited for the particular application. In general, when coating feed compositions to be consumed by smaller animals, more uniform coverage is preferred requiring smaller droplet sizes, because the animals consume less of the feed. Where the animal consumes large amounts of the feed, uniform application of the additive is not as necessary and larger droplet sizes can be used.

The flow rates of the various ingredients fed into the system of the present invention will depend upon the particular application, the size of the system, and many other numerous factors. In most applications, when coating a feed composition having a bulk density of from about 25 pounds per cubic foot to about 45 pounds per cubic foot, the flow rate of the feed composition through rotating drum 76 can be from about 8 tons per hour to about 80 tons per hour. In this flow rate range for the feed composition, the liquid suspension can be dispensed onto the feed composition at a rate of from about 1 gallon per hour to about 30 gallons per hour. Generally, the solid feed additive or additives will be present in the liquid suspension in an amount from about 1% by weight to about 40% by weight, and more particularly, from about 8% by weight to about 10% by weight. The air flow rate needed to atomize the suspension can be from about 2 cubic feet per minute to about 40 cubic feet per minute and can be at a pressure of up to about 30 psi, and particularly, between about 20 psi to about 25 psi.

One particular problem that can be experienced when atomizing a suspension is that the nozzles can become clogged with the solid additive. In order to prevent this problem from occurring, the system of the present invention can include an automatic nozzle clean-out system. As shown in FIG. 2, air line 86 can be connected to an air clean-out line 92, which contains a solenoid valve 94 for controlling air flow. Air clean-out line 92 is connected to a plurality of nozzle cleaning devices 96. When subjected to air pressure, nozzle cleaning devices 96 thrust a needle 98 into corresponding nozzles 84 for removing any particulate matter that may be accumulating within the nozzles. Of particular advantage, nozzle cleaning devices 96 can be actuated at periodic intervals without substantially interfering with the flow of the liquid suspension. For instance, in one embodiment, nozzle cleaning devices 96 can be actuated approximately every 15 seconds to about 3 minutes.

Besides using air actuated nozzle cleaning devices, spring actuated devices may also be used within the system of the present invention. For instance, nozzle cleaning devices 96 can include a spring in operative association with a needle such that the spring thrusts the needle into a corresponding nozzle when there is no air pressure in line 92.

Should nozzles 84 become clogged, however, the system of the present invention can include a relief circuit 110 containing a pressure relief valve 112, a pressure switch 114, and a check valve 116. In this configuration, when nozzles 84 become clogged, pressure relief valve 112 opens, allowing the suspension to enter relief circuit 110 and circulate back to holding tank 32 as shown in FIG. 1.

In one alternative embodiment, the relief circuit described above can include a pressure transmitter. The pressure transmitter can be used to open a solenoid valve for recirculating the suspension back to holding tank 32 and can include an audible or visible alarm for indicating to an operator that the nozzles have become clogged.

Nozzles 84 selected for use in the system of the present invention can be any suitable nozzle capable of atomizing and applying the suspension to the feed composition. In one embodiment, nozzle 84 can be configured to combine air with the liquid suspension inside the housing of the nozzle.

Figure 6:
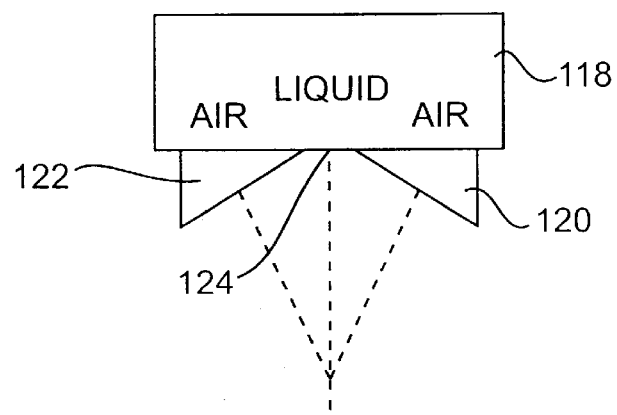

Alternatively, as shown in FIG. 6, a nozzle 118 may be selected that combines the liquid suspension with air outside the housing of the nozzle. As shown in FIG. 6, in this embodiment, air streams 120 and 122 contact a liquid suspension stream 124 to form a liquid spray.

Figure 5:
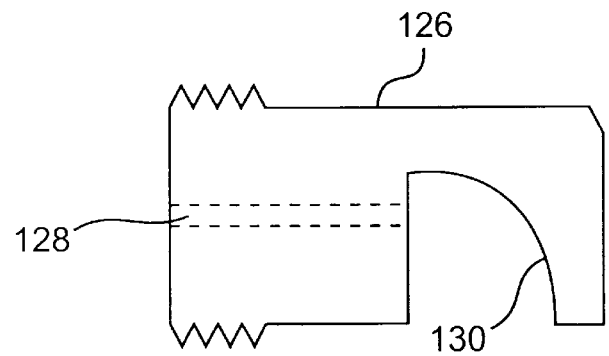

Another alternative design of a nozzle 126 is illustrated in FIG. 5. Nozzle 126 is designed to convert a liquid stream into droplets with or without the use of air. Specifically, nozzle 126 includes a liquid passage 128 adapted to receive a stream of the liquid suspension which may or may not be mixed with air. The stream of the liquid suspension passes through passage 128 and contacts an impact surface 130, causing the liquid suspension to form droplets and disperse as a spray over the feed composition.

Nozzle 126 is particularly well adapted to prevent clogging. Specifically, through the use of impact surface 130, the diameter of liquid passage 128 can be larger than the diameter of a conventional nozzle. The larger diameter passageway is less likely to clog and also lowers the energy requirements for operating the nozzle.

Once the liquid suspension exits nozzles 84, the suspension contacts and combines with feed composition 78, causing the solid additive to adhere to the feed composition. In order to promote mixing between feed composition 78 and the spray of the liquid suspension, drum 76 can be adapted to continuously rotate during the process. As shown in FIG. 3, drum 76 includes a motor 132 which can be adjustable for controlling the rate of rotation. Ideally, drum 76 will rotate at a speed that will cause the feed composition to travel from about 45° to about 90° up the walls of the drum, to ensure complete mixing. In most applications, the drum can be rotated at a speed from about 10 rpms to about 48 rpms.

Figure 4:
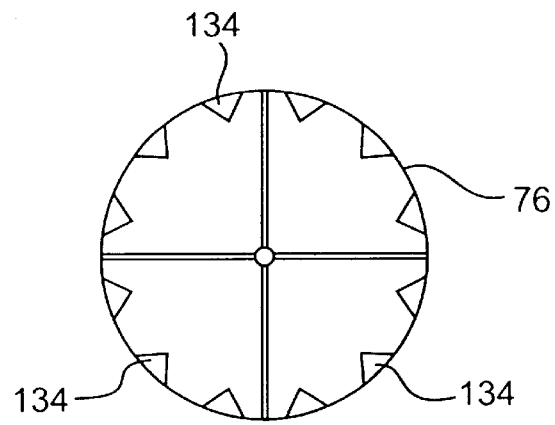

Referring to FIG. 4, in order to enhance mixing of the feed composition with the liquid suspension, rotating drum 76 can include a plurality of projections 134 (i.e. 1 inch angle or ⅜ inch rounded keyway stock) mounted to the interior surface of the drum. Projections 134 are designed to cause the feed composition particles to travel up the sides of the drum walls in order to spread out the feed composition and to enhance mixing.

The system of the present invention as shown in FIG. 1 is adapted to be completely automated. In this regard, the system includes a controller 136, which can be a microprocessor or other programmable device. As shown by the dotted lines, controller 136 can be electrically connected to all of the pumps, valves, motors, load cells, and feed augers contained in the system. Controller 136 can be programmed to control the flow rates of all of the components and to monitor system conditions. For instance, controller 136 can be electrically connected to load cell 12 and to load cells 36 and 38 for automatically measuring the amounts of the liquid carrier and the solid additives that are fed to the system.

The sequence of operation as may be controlled by controller 136 of the system illustrated in FIG. 1 will now be discussed in detail.

Initially, pump 22 is actuated and solenoid valve 28 is opened in order to feed the liquid carrier to holding tank 32. When the liquid carrier reaches a predetermined set point in holding tank 32 as indicated by load cell 36, pump 22 is turned off and valve 28 is closed.

Pump 40 is then energized to circulate the liquid carrier within mixing pipe 44. Feed auger 14 is activated and the solid additive is fed to eductor 48. When the solid additive reaches a set point, as indicated by load cell 12, feed auger 14 is turned off. At this point, first holding tank 32 is ready for dispensing the formed suspension. Prior to dispensing the suspension, however, the suspension can be circulated within recirculation line 70 by opening valve 56, turning on pump 58, and opening three-way solenoid valve 64. The suspension, once formed, is continuously circulated in order to prevent settling of the solid additive.

Once the suspension in first holding tank 32 is formed and ready for dispensing, the above process can be repeated for forming a suspension in second holding tank 34. Specifically, the liquid suspension can be formed within holding tank 34 as the suspension in holding tank 32 is dispensed to dispensing device 74. When load cell 36 then indicates that holding tank 32 is empty, the suspension formed in holding tank 34 can be dispensed to dispensing device 74 and simultaneously, the mix cycle can be repeated for holding cell 32. In this configuration, a liquid carrier and feed additive suspension is continuously fed to dispensing device 74.

When dispensing the formed suspension from holding tank 32, load cell 36 in combination with pump 58 controls the flow rate of the suspension to dispensing device 74. The flow rate can be adjusted based on the flow rate of feed composition 78 as indicated by load cell 82. The drum speed of rotating drum 76 can also be monitored and controlled using motor 132 which can have a built-in tachometer.

Figure 7:
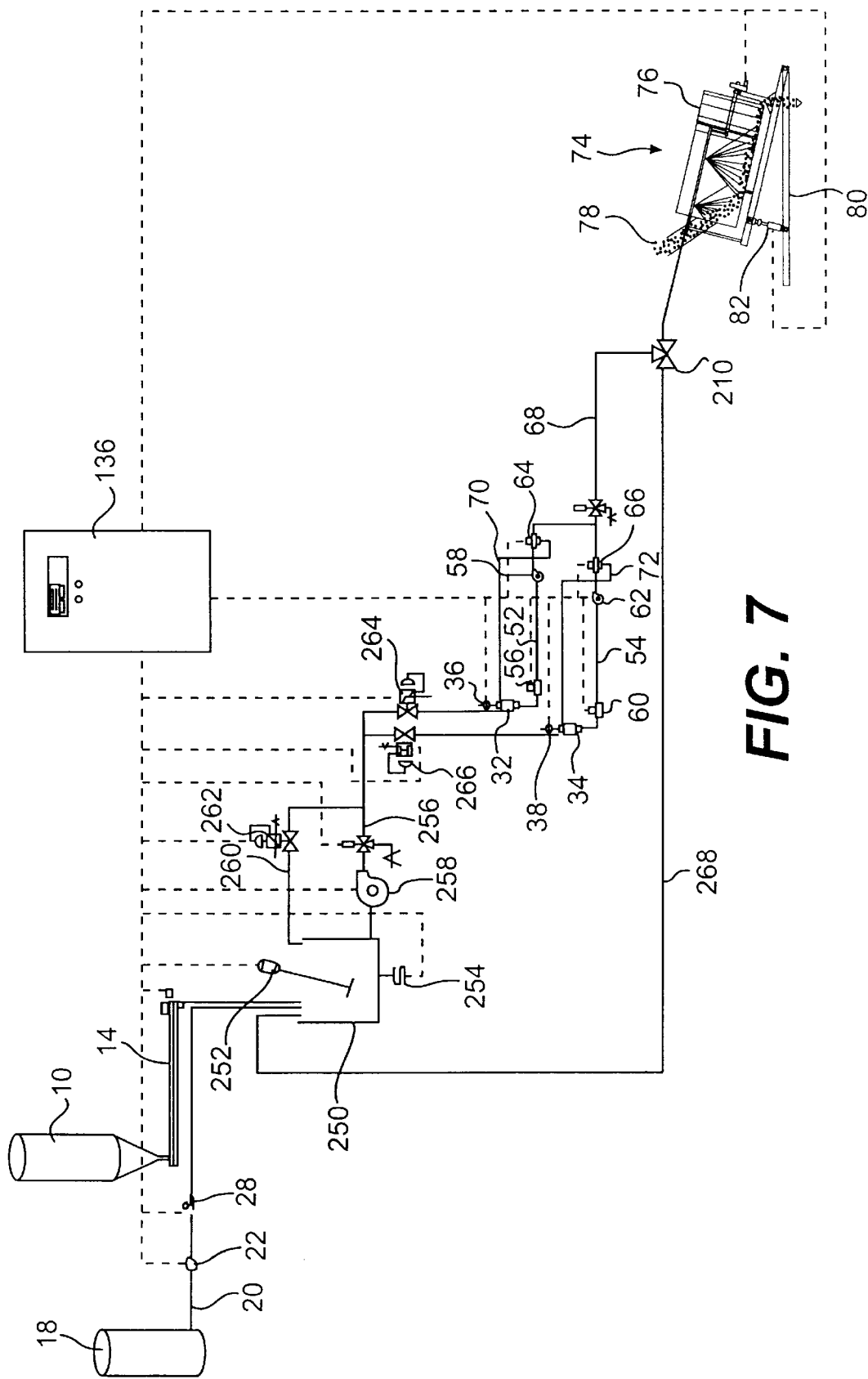

Referring to FIG. 7, an alternative preferred embodiment of a system for formulating a solid feed suspension and for applying the feed suspension to a feed composition is illustrated. As shown, like reference numerals used in the Figures are intended to represent same or analogous features or elements of the invention. In the embodiment illustrated in FIG. 7, instead of using a pair of cooperating eductors, the system includes a single mixing tank 250 equipped with a mixing device 252.

More particularly, a solid additive is fed to mixing tank 250 from storage reservoir 10 via feed auger 14. In mixing tank 250, the solid additive is mixed with a liquid carrier which is dispensed from liquid reservoir 18 using a pump 22. In order to measure the quantities of the solid additive and liquid carrier being fed to mixing tank 250, the mixing tank includes a measuring device, such as a load cell 254. Optionally, mixing tank 250 can also include a level detector for indicating the volume of any liquids being added to the tank.

Once measured amounts of the solid feed additive the and liquid carrier are added to mixing tank 250, the ingredients are mixed by mixing device 252. The formed suspension is then dispensed from mixing tank 250 through mixing conduit 256 using a pump 258. In order to facilitate mixing and to prevent settling, the system can include a recirculation conduit 260 for recirculating all or a portion of the formed suspension back to mixing tank 250 by opening a valve 262.

Similar to the embodiment illustrated in FIG. 1, once formed, the feed additive suspension is dispensed from mixing tank 250 to either a first holding tank 32 or to a second holding tank 34. The flow of the suspension can be directed to either holding tank 32 or holding tank 34 using valves 264 and 266 respectively. The amount of the feed additive suspension fed to each of the holding tanks can be monitored using load cell 254. Once dispensed to holding tanks 32 and 34, the suspension can be applied to feed composition 78 by dispensing device 74.

The system illustrated in FIG. 7 further includes a recirculation line 268 which extends from a three way valve 270 to mixing tank 250. Recirculation line 268 is provided for directing the feed additive suspension back to mixing tank 250 in case it is not desirable to direct the suspension into dispensing device 74.

The systems illustrated in FIGS. 1 and 7 have proven to be well adapted and extremely efficient in applying even the smallest quantities of solid additives onto feed compositions. One of the major problems experienced in conventional systems is the ability to uniformly and precisely apply small quantities of an additive. For instance, when applying enzymes to a solid feed composition, the enzymes are typically added in an amount from about 0.09 pounds to about 0.11 pounds per ton of feed. In this regard, the systems of the present invention have proven to be effective in uniformly applying amounts of a feed additive in quantities as low as 6 grams of additive per ton of feed.

Figure 8:
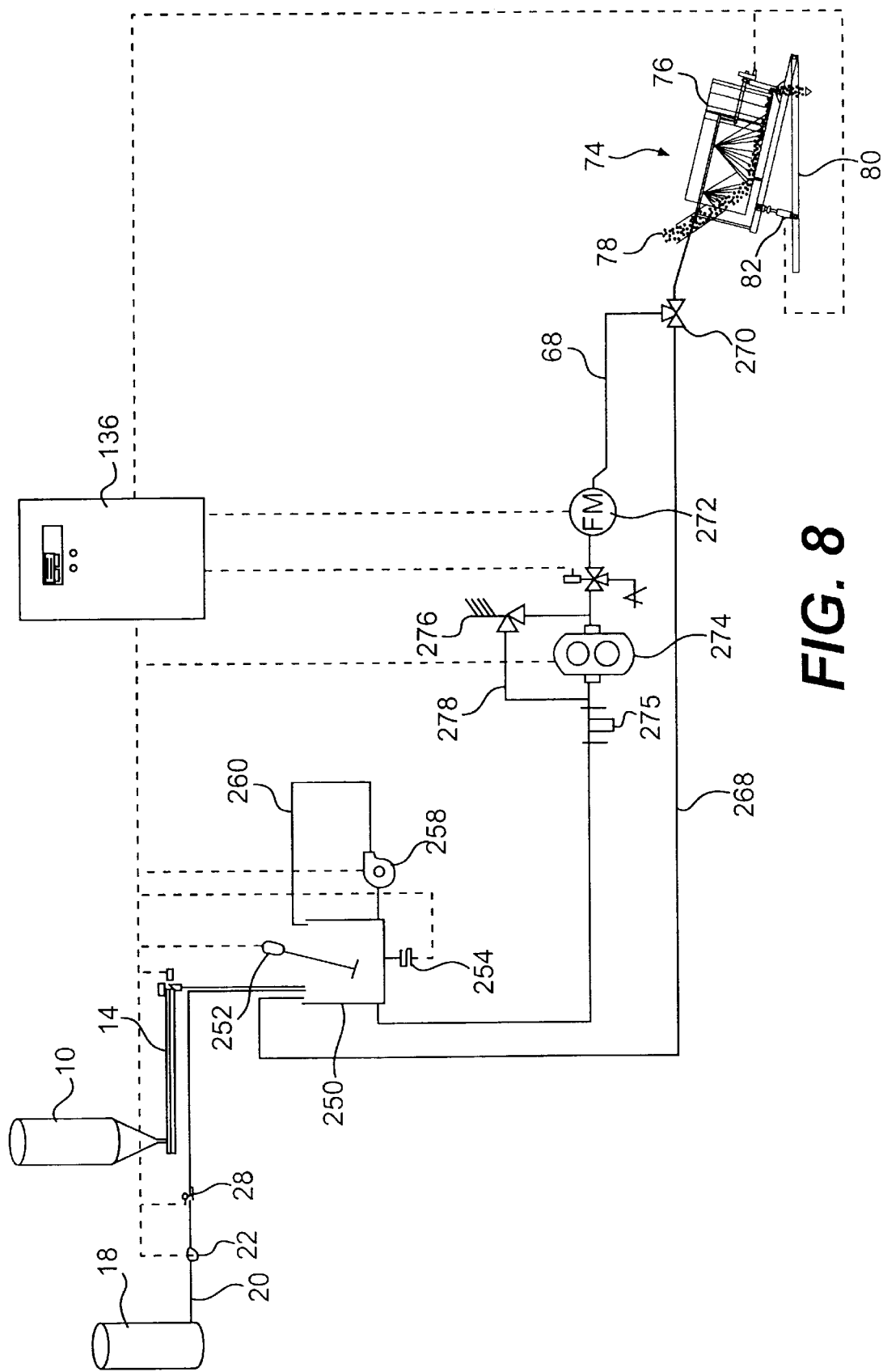

Referring to FIG. 8, a further embodiment of a system for applying a feed additive suspension to a feed composition is illustrated. Like reference numerals appearing are intended to represent same or analogous features of the invention.

In this embodiment, similar to the embodiment illustrated in FIG. 7, a single mixing tank 250 is used to formulate the solid feed additive suspension. Mixing tank 250 is in communication with a pump 258 and a recirculation conduit 260 for continuously circulating and mixing the suspension in order to prevent settling.

In this embodiment, however, instead of using a plurality of holding tanks, a mass flow meter 272 and a pump 274 are used to convey the suspension in measured amounts to dispensing device 74. Specifically, mass flow meter 272 controls and monitors the mass flow rate of the suspension.

In one embodiment, mass flow meter 272, besides monitoring the mass flow rate of the suspension, can also be configured to indicate the density of the suspension. Thus, in this embodiment, mass flow meter 272 not only controls the amount of the suspension fed to dispensing device 74 but also can be used to indicate the percent solids in the suspension.

As shown in FIG. 8, in one embodiment, mass flow meter 272 and pump 274 can be in communication with controller 136. Based on information received from mass flow meter 272, controller 136 can control the speed of pump 274 for dispensing the suspension at a desired and precise rate.

In order to prevent clogging of the valve or of nozzles contained in the system, a basket strainer 275, in this embodiment, is positioned before pump 274. Basket strainer 275 is included in order to remove any feed additive agglomerates that may be contained within the suspension.

The system illustrated in FIG. 8 can also include a relief valve 276 located on conduit 278. Relief valve 276 and conduit 278 allow the suspension to circulate around pump 274 in case flow problems are experienced downstream.

The embodiment illustrated in FIG. 8 is particularly well adapted for batch processes.

In one particular embodiment, the systems illustrated in FIGS. 1, 7 and 8 are particularly well suited to combining an enzyme powder made from eggs with an organic liquid (fat or oil), such as soybean oil or animal fat. The egg powder enzyme can be added to a feed composition in order to aid digestion of the animal ingesting the feed. Since egg powder enzymes degrade when exposed to water, the liquid carrier, in this embodiment, should be an organic liquid (fat or oil). The egg powder enzyme can be added to the oil in an amount of about 5% to about 30% by weight, and particularly in an amount of about 10% by weight.

The process of the present invention is also well suited to combining yeast with a vegetable oil and applying the mixture to a feed composition, also for aiding digestion. Similar to the egg powder enzyme, yeast also should not be combined with water. The yeast can be combined with a vegetable oil, such as soybean oil, in an amount of approximately 5% by weight and applied to the feed composition.

Besides yeast and an egg powder enzyme, however, other various solid additives may be used in the process of the present invention. Other additives include flavorings, vitamins, other enzymes, and antioxidants. The solid additive can be combined alone or mixed with other additives. Also, the systems illustrated in the figures can be used to combine solid additives with liquid additives prior to application to a feed composition.

Figure 9:
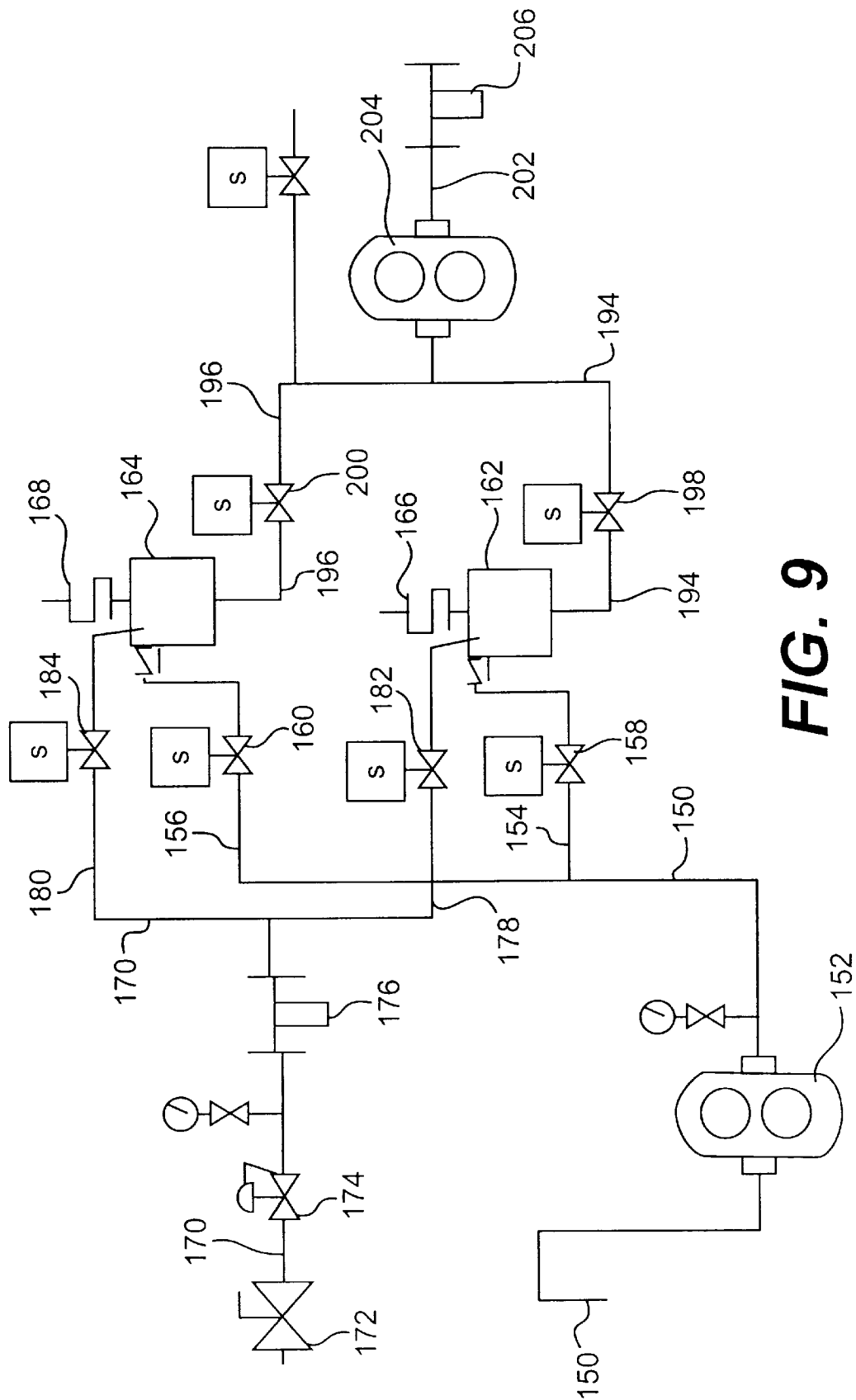

Besides systems designed to apply solid additives to feed compositions, the present invention is also directed to systems designed to apply liquid additives to feed compositions. For instance, one example of a system designed to formulate a solution containing a liquid additive and to apply the solution to a feed composition is illustrated in FIG. 9. More particularly, the system illustrated in FIG. 9 is designed to dilute a liquid additive with water or oil and to continuously feed the resulting solution to a feed composition.

The system includes a liquid additive feed line 150 for introducing the liquid additive into the system. Feed line 150, for instance, can be in communication with a liquid reservoir. The liquid additive is pumped through feed line 150 by a pump 152 into a first feed pipe 154 or into a second feed pipe 156. The flow of the liquid additive into first feed pipe 154 and into second feed pipe 156 is controlled by corresponding solenoid valves 158 and 160. First feed pipe 154 empties into a first mixing tank 162, while second feed pipe 156 empties into a second mixing tank 164. The amount of the feed additive fed to mixing tanks 162 and 164 is determined by load cells 166 and 168, respectively.

The system in FIG. 9 also includes a dilution agent feed line 170 which can be, for instance, adapted to introduce into the system either water or an oil. The system illustrated in FIG. 9 is particularly configured for using water obtained from a pressurized source. If oil were being fed into the system, the system would include a pump and a reservoir tank, which may be heated as described previously.

When connected to a pressurized water line, the system includes feed valve 172, a control valve 174, and, if necessary, a filter such as a basket strainer 176. Valves 172 and 174 are adapted to monitor the flow rate of the water into the system, while basket strainer 176 is designed to filter out any solid contaminants contained within the water.

Water is fed to the system from dilution agent feed line 170 into a first dilution pipe 178 or a second dilution pipe 180. The flow of water through dilution pipes 178 and 180 are controlled by corresponding solenoid valves 182 and 184. Ultimately, dilution pipes 178 and 180 feed water into mixing tanks 162 and 164, respectively for mixing with the liquid additive. Load cells 166 and 168 are used to monitor and measure the amount of the dilution agent fed to mixing tanks 162 and 164.

Figure 10:
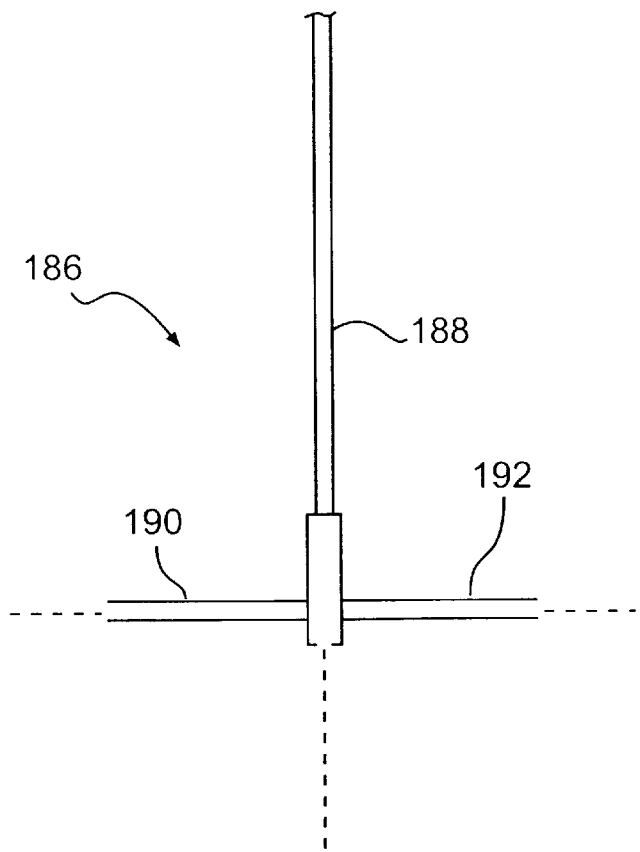
Figure 11:
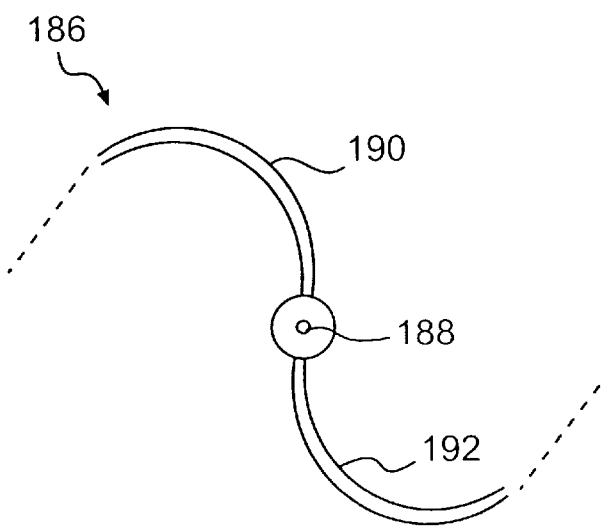

Once the liquid additive and water are fed to mixing tanks 162 and 164, the ingredients can be mixed by any suitable mixing device. In one embodiment, however, a mixing device can be used that uses the force of the entering liquid to mix the components together. Such a mixing device generally 186 is illustrated in FIGS. 10 and 11. Mixing device 186 includes a rod 188 connected to mixing arms 190 and 192. More particularly, rod 188 and mixing arms 190 and 192 are hollow, forming a pipe for each of the entering liquid ingredients. As shown in FIG. 11, the liquid ingredients can be introduced into rod 188 and then flow into mixing arms 190 and 192. Mixing arms 190 and 192 discharge the liquid ingredients into the mixing tanks through appropriately sized orifices. Further, because mixing arms 190 and 192 are curved, the discharging liquid causes the arms to rotate within the tanks and mix the ingredients. Rod 188 can also include a ¹⁄₁₆" orifice located at the end of the rod to stir the bottom of the tank. The design of the mixing device allows for a steady load cell signal since the liquid flow forces are perpendicular to load cell direction.

In an alternative embodiment, arms 190 and 192 can be stationary. In this embodiment, the velocity of the liquid itself stirs the contents of the tank.

Once the liquid additive and the dilution agent are mixed, the resulting solution is discharged from mixing tanks 162 and 164 through exit pipes 194 and 196, respectively. The flow of the solution through exit pipe 194 is controlled by a solenoid valve 198, while the flow of the solution through exit pipe 196 is controlled by a solenoid valve 200. Both exit pipes 194 and 196 ultimately lead into a discharge line 202. A pump 204 is used to pump the formed solution from mixing tanks 162 and 164. If desired, a second basket strainer 206 can also be placed in the system to remove any further impurities contained within the solution.

From discharge line 202, the formed solution is then applied to a feed composition. For instance, the solution can be applied to a feed composition using dispensing device 74 illustrated in FIG. 3. Alternatively, the formed solution containing the liquid additive can simply be fed through a sprayer and sprayed on the feed composition traveling on a conveyor or other transporting device.

The nozzles illustrated in FIGS. 5 and 6 may be used to apply the liquid solution. The use of air to atomize the solution may or may not be necessary, depending upon the particular application.

Flow rates of the solution and of the feed composition will vary, depending upon the particular application and many other factors. In general, the solution will be fed to a feed composition at a rate from about 1 gallon per hour to about 30 gallons per hour. This range is particularly applicable where the feed composition has a bulk density of from about 25 pounds per cubic foot to about 45 pounds per cubic foot and has a flow rate of about 8 tons per hour to about 80 tons per hour. The liquid solution can be applied on the feed using, for instance, a drum coater (see FIG. 3) or a vertical-fall spray chamber. In one embodiment, a vertical-fall spray chamber is used which includes a flow splitter, with two nozzles above and one nozzle below the splitter. At the above flow rates, an adequate residence time of the feed composition within a vertical-fall spray chamber has been found, in one embodiment, to be about 0.06 seconds to about 0.8 seconds.

As shown in FIG. 9, the system, similar to the system shown and described in FIG. 1, includes two sub-mixing systems so that the formed solution can be applied continuously to the feed composition. In the embodiment illustrated in FIG. 9, only one liquid additive is mixed with a single dilution agent. Alternatively, however, many different liquid additives can be fed to the system and to mixing tanks 162 and 164. To expand the system, further feed lines can be connected to mixing tanks 162 and 164 and can have the same valving arrangement as used to feed the single liquid additive illustrated in FIG. 9. For instance, in some applications, it will be necessary to feed six different liquid additives to the mixing tank and to combine the liquid additives with an oil or water dilution agent.

Figure 12:
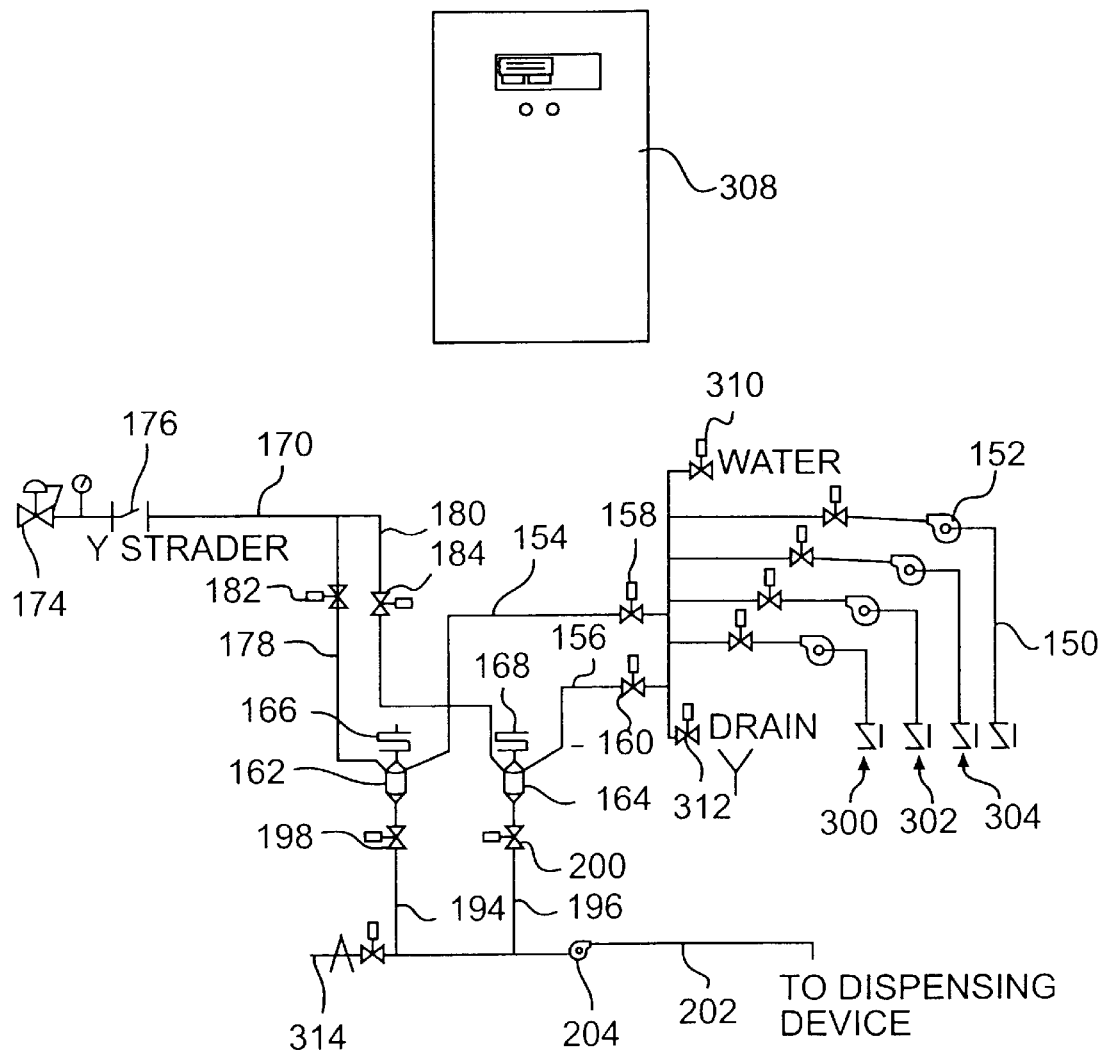

Referring to FIG. 12, an alternative embodiment of a system for applying liquid additives to feed compositions is shown. The system illustrated in FIG. 12 is similar to the embodiment appearing in FIG. 9. Same reference numerals used in FIG. 12 are intended to indicate same are analogous features or elements of the invention.

As opposed to the embodiment illustrated in FIG. 9, the system shown in FIG. 12 includes three further liquid additive inlet ports generally 300, 302 and 304. Each inlet port includes a corresponding pump and valve for feeding the various liquid additives into the system.

A controller 308 is also illustrated in FIG. 12 for controlling various elements in the system. Controller 308, in one embodiment, can be used to completely automate the process. Similar to the system illustrated in FIG. 1, controller 308, such as a programmable microprocessor, can be capable of controlling all of the valves and pumps contained in the system. Controller 308 can also be in communication with the load cells for accurately measuring the ingredients, formulating solutions, and dispensing the solutions appropriately.

In the embodiment illustrated in FIG. 12, a further water source 310 is included in combination with the feed additive inlet ports. Water source 310 can be used for pre-mixing some of the liquid additives or can be used to clean out or rinse various parts of the system, such as through drain 312. Similarly, the system also includes an air purge line 314 for preventing solids from settling within the lines or to clear the lines of destabilized enzymes.

Figure 13:
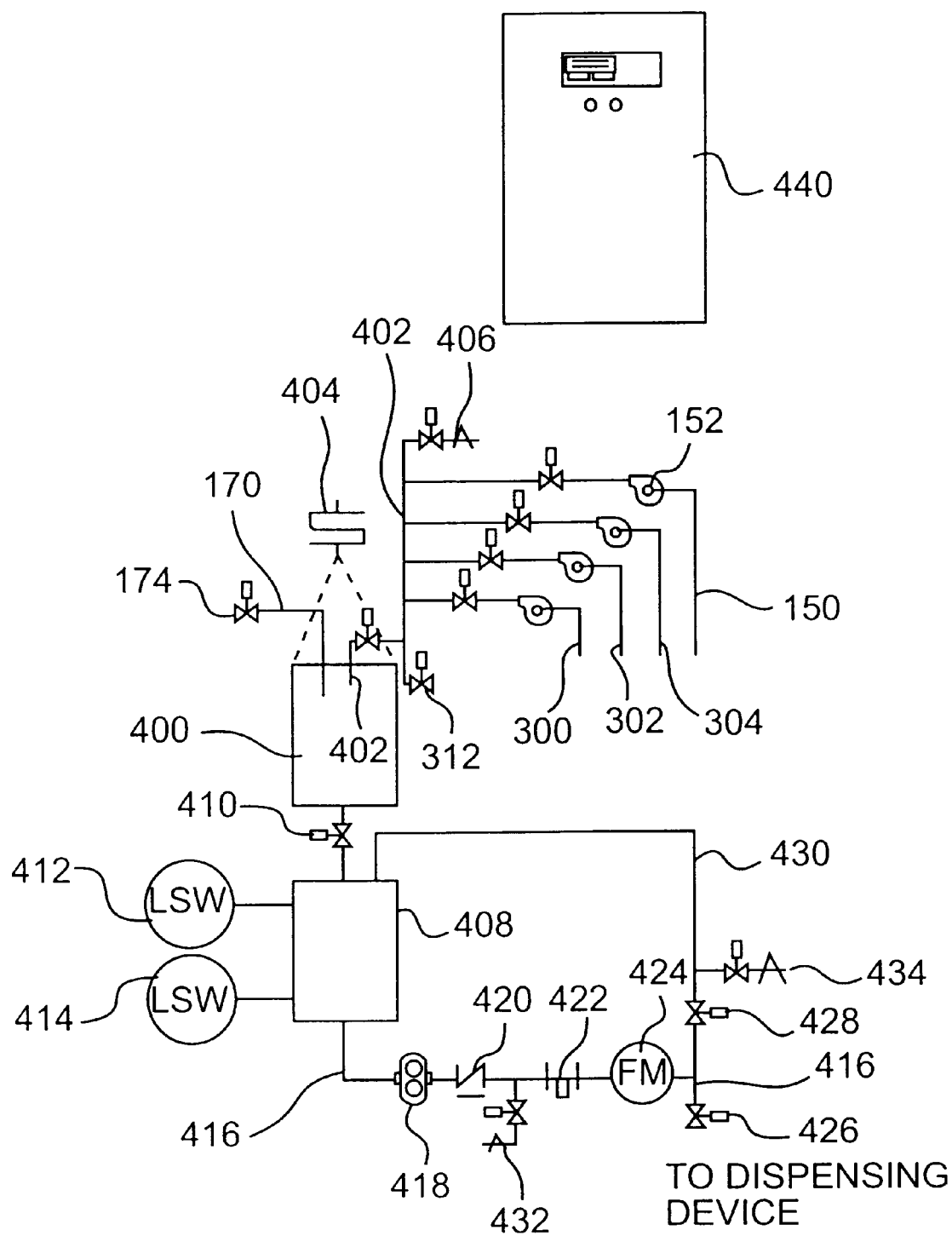

One further embodiment of a system for mixing and/or diluting liquid additives and applying the resulting solution to a feed composition is illustrated in FIG. 13. The embodiment illustrated in FIG. 13 is particularly well adapted to treat solid feed composition lines that have intermittent flow rates. In the embodiment illustrated in FIG. 13, common reference numerals are intended to represent same or analogous features or elements of the invention.

The system illustrated in FIG. 13 includes four liquid additive inlet ports 150, 300, 302 and 304. Flow of the liquid additives is controlled by a respective pump and a valve. The liquid additives are fed into a single mixing tank 400 through conduit 402. If the liquid additives are fed to mixing tank 400 consecutively, a load cell 404 can be used to determine the amount of each additive fed to the tank.

In order to prevent conduit 402 from becoming blocked, the system includes an air purge line 406 in communication with a drain 312. Conduit 402 can be cleaned by feeding high pressure air into line 402, which is then released through drain 312.

For blending a dilution agent with the liquid feed additives, the system includes a dilution agent feed line 170 in combination with control valve 174. Dilution agent feed line 170 can be used to feed, for instance, water, a vegetable oil, or an animal oil into mixing tank 400.

Once the liquid additives and dilution agent are fed to mixing tank 400, the resulting solution is fed to a dispense tank 408 through a pinch valve 410. Dispense tank 408 includes level switches 412 and 414 which indicate when the tank is full or empty.

From dispense tank 408, the formed solution enters a dispense line 416 with the assistance of a pump 418. From pump 418, the solution passes through a check valve 420, a basket strainer 422 and a flow meter 424. Flow meter 424 is used to control and monitor the amount of the solution being dispensed to a dispensing device through a valve 426.

As stated above, the embodiment illustrated in FIG. 13 is particularly well adapted to applying a feed additive solution to a feed composition experiencing intermittent flow. In this regard, should it be desirable to immediately stop application of the solution, valve 426 can be closed and valve 428 can be opened for diverting the flow of the solution into a recirculation line 430. As shown, recirculation line 430 empties into mixing tank 400. In this arrangement, line pressure remains constant so that if it is necessary to once again begin dispensing the feed additive solution onto a feed composition, the solution can be dispensed immediately at the proper flow rate.

As shown in FIG. 13, dispense line 416 and recirculation line 430 include air purge lines 432 and 434 for preventing the lines from becoming clogged or blocked.

Finally, a controller 440 is also illustrated to show that the system can be completely automated if desired. Similar to the embodiments described above, controller 440 can be placed in communication with all valves, pumps and measuring equipment for automatically formulating a feed additive solution and for dispensing the solution at a predetermined flow rate.

Figure 14:
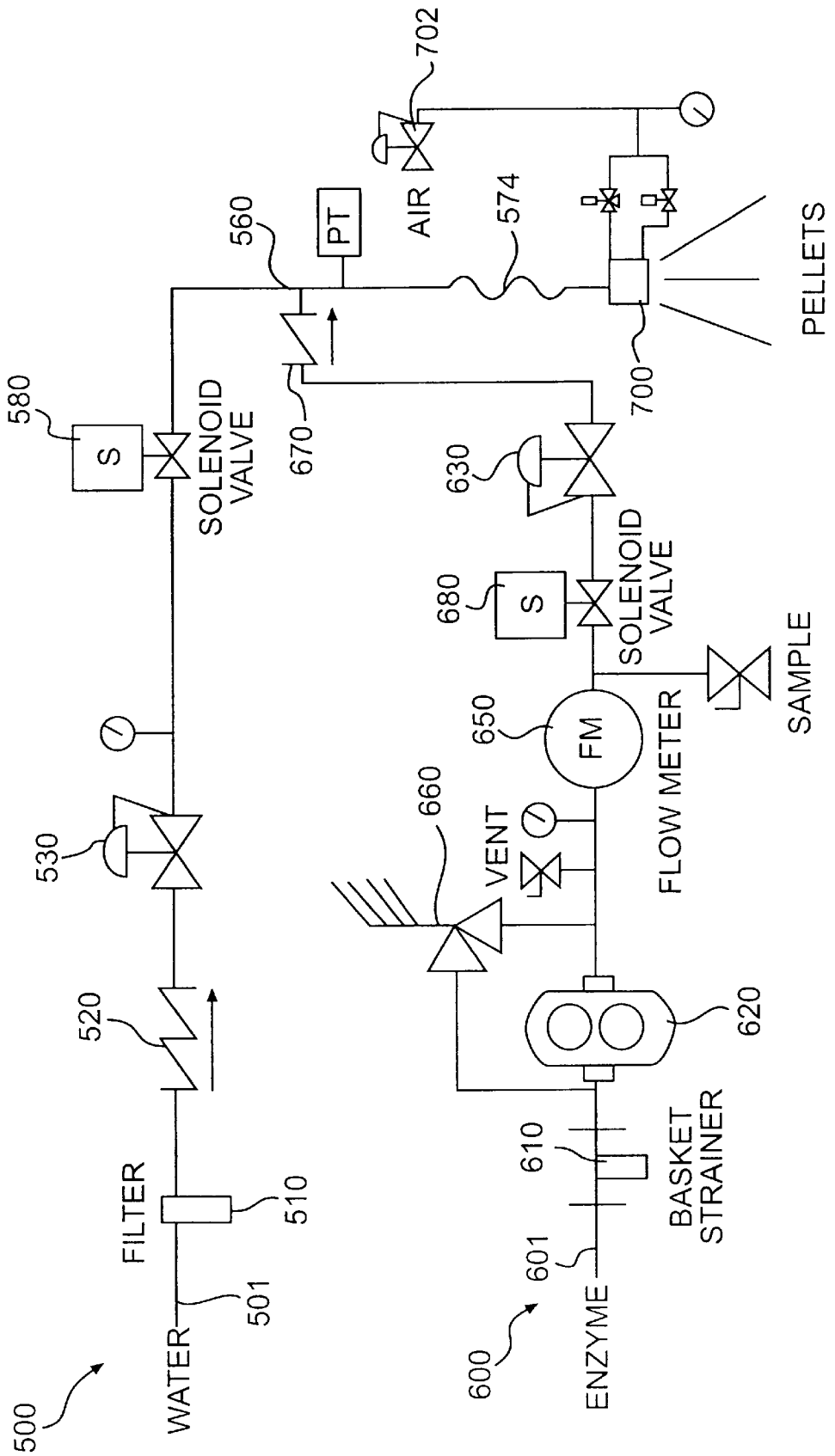

In addition to the above illustrated embodiments, another embodiment of a system for applying liquid additives to feed compositions is shown in FIG. 14. The system illustrated in FIG. 14 is generally designed to allow mixing of a liquid feed additive just prior to applying the resulting suspension to a feed composition. By mixing the liquid feed additive with water just prior to application, the liquid feed and water are not contacted for an extended period of time, thereby preventing the degradation of the activity of the liquid feed, generally an enzyme, by impurities present within the water.

The system as shown in FIG. 14 generally includes two components, a diluent stream, such as a water stream 500, and a liquid additive stream 600. The liquid additive can be, for instance, an enzyme. Water stream 500 enters the system at inlet 501 under pressure from a water source.

In the embodiment illustrated in FIG. 14, water stream 500 flows through a filter 510, which generally removes any debris from the water that would interfere with the operation of the system. After exiting filter 510, water stream 500 also passes through a backflow preventor 520 and a pressure regulator 530. Backflow preventor 520 is for preventing the liquid feed additive from flowing back into the water supply. Pressure regulator 530, on the other hand, aids in maintaining the pressure of stream 500 at a desired level. In particular, pressure regulator 530 can be used to reduce the supply pressure of the water in order to adjust the feed additive flow rate that is dispersed onto a feed stream as will be described in more detail hereinafter.

As shown, water stream 500 is also in communication with a valve 580, such as a solenoid valve. Solenoid valve 580 is for controlling the flow of water to a spray nozzle 700 in order to apply the liquid feed additive at appropriate times. More particularly, when the system is not being used to apply the additive to a feed composition, valve 580 is closed and, conversely, when it is desired to apply the additive to a feed composition, valve 580 is opened.

Besides including water stream 500, the system of the present invention also generally includes at least one liquid feed additive stream. As shown in the embodiment of FIG. 14, the system includes liquid feed additive stream 600 which enters the system via inlet 601. Debris is generally removed from liquid additive stream 600 by a strainer 610.

As shown, liquid additive stream 600 is in communication with a pump 620, such as a positive displacement pump. Pump 620 is for pumping the liquid additive from a container or other source into water stream 500. If desired, pump 620 can be placed in communication with a pressure relief device 660 in order to prevent and protect the system from over pressurization.

The feed additive supply line also includes a pressure regulator 630, a check valve 670, a flow meter 650, and a valve 680, such as a solenoid valve. Pressure regulator 630 is provided in order to maintain liquid feed additive stream 600 at a constant pressure. In particular, pressure regulator 630 evens out any pressure fluctuations that may occur prior to or after the pump for providing the liquid additive to water stream 500 at a constant pressure and thus at a more steady flow rate. Check valve 670, on the other hand, is provided in order to prevent the back flow of water stream 500 into liquid additive stream 600. Flow meter 650 is for indicating the flow rate of liquid additive stream 600 as the liquid additive is being mixed with the water stream.

Similar to valve 580, solenoid valve 680 is for enabling and disabling the flow of the liquid additive to spray nozzle 700. In general, solenoid valve 680 is either in an open position or a closed position depending upon whether a feed composition stream is being treated with the liquid additive.

Figure 15:
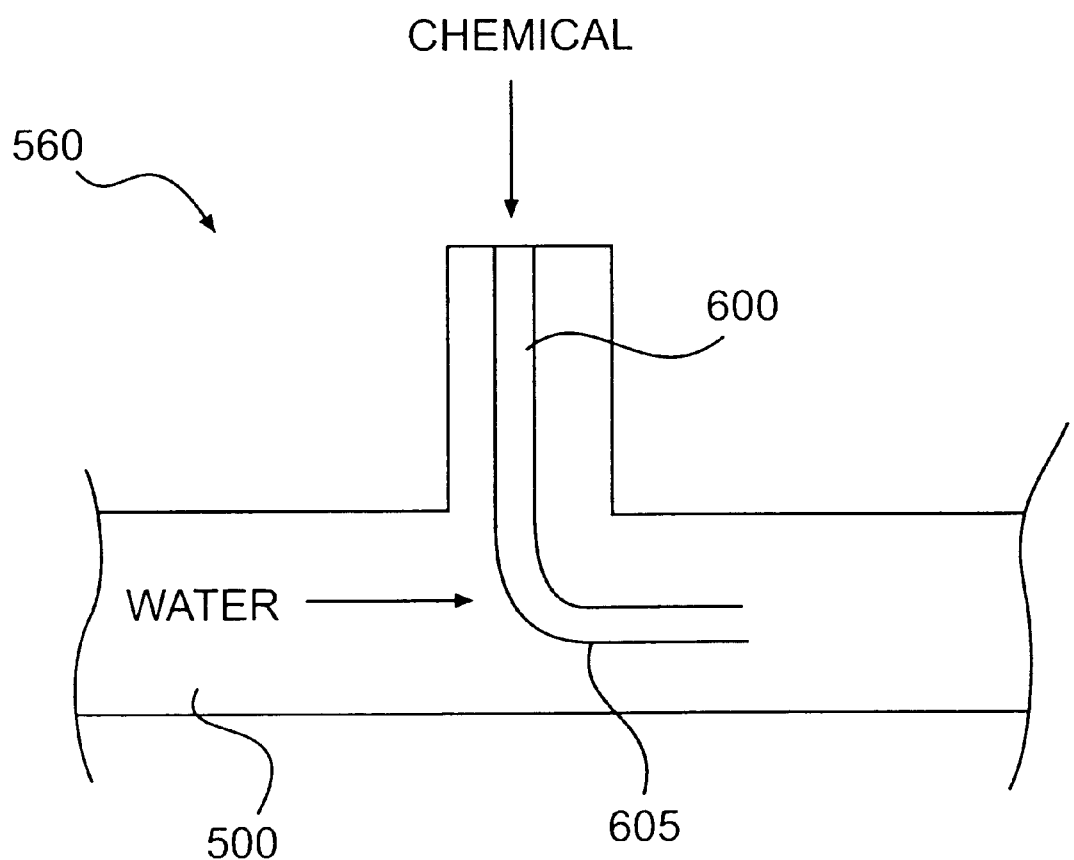

As shown in FIG. 14, liquid additive stream 600 and water stream 500 are combined at a junction 560. Junction 560 can be any appropriate and suitable stream combining device. For instance, as shown in FIG. 15, in one embodiment, liquid feed additive supply 600 and water supply 500 are combined in a specially designed T-fitting. Specifically, as shown, T-fitting 560 includes a curved conduit section 605 which delivers the liquid feed additive into water stream 500. In particular, conduit section 605 can be concentric with the water line for delivering the liquid feed additive in the middle of the water stream.

With respect to the embodiment shown in FIG. 15, in order for feed additive stream 600 to be combined with water stream 500 during operation of the system, the pressure of feed additive stream 600 must be greater than water stream 500. In this manner, various controls can be placed into the system for only combining the two streams at desired times.

Referring back to FIG. 14, after water stream 500 and liquid feed additive stream 600 are combined at junction 560, the streams are fed through a static mixer 574 which can be used to uniformly blend both streams together. It should be understood, however, that besides the static mixer 574, any other suitable mixing device can be used in the system of the present invention.

After sufficient mixing, the resulting liquid blend is generally added to a solid feed composition using spray nozzle 700. Spray nozzle 700 can be any of the spray nozzles mentioned in the previous embodiments. As shown in FIG. 14, spray nozzle 700 is in communication with an air source 702. Air source 702 is for providing pressurized air to nozzle 700 for either being used to clean out the nozzle and/or for atomizing the aqueous solution that is being applied to the solid feed composition. The use of air to atomize the solution may or may not be necessary, depending upon the particular application.

In one preferred embodiment of the present invention, spray nozzle 700 is a calibrated preset nozzle that is designed to allow a predetermined amount of fluid to exit the nozzle at any preset pressure. Thus, by knowing the pressure of the fluid entering the nozzle, the flow rate of fluid exiting the nozzle is easily determined. By using a calibrated nozzle, a flow meter positioned before the nozzle or within the water source line is not necessary or needed.

In one embodiment of the system illustrated in FIG. 14, the system can further include a controller (not shown) for controlling various elements in the system. For example, the controller, which can be a microprocessor or PLC, can be used to completely automate the process. The controller can be capable of controlling all the valves and pumps contained in the system. The controller can also be configured to receive information from the flow meter and from the pressure regulators if desired. Ultimately, the controller can be responsible for accurately measuring the ingredients, formulating a solution, and dispensing the solution appropriately.

For instance, based on a desired inclusion rate of the liquid feed additive, the flow rate or pressure of liquid additive 600 necessary to achieve such an inclusion rate can be determined by the controller. In one embodiment, the pressure of water source 500 can be set at a determined level. As described above, by setting the water supply at a particular pressure, nozzle 700 can be designed to emit a particular amount of solution.

The controller then adjusts the speed of pump 620 in order to ensure that a particular amount of the feed additive is being mixed with the water stream. Flow meter 650 conveys the actual flow rate of liquid additive 600 to the controller, which, in turn, controls the speed of pump 620 such that the actual flow rate of liquid additive feed 600 comports with the desired flow rate.

In one embodiment, the controller can also be placed in communication with a device that measures the flow rate, such as the mass flow rate, of the solid feed composition that is being treated. The controller can be configured to adjust the amount of the liquid feed additive that is mixed with the water stream in response to fluctuations in the mass flow rate of the feed composition. In one preferred embodiment, the pressure of water stream 500 is maintained at a constant level while the pressure of the liquid additive stream is adjusted using pump 620 for increasing or decreasing the amount of the liquid additive present in the ultimate solution that is applied to the solid feed composition in response to the mass flow rate of the feed composition.

In this manner, the system illustrated in FIG. 14 is well suited to applying very small amounts of a liquid feed additive to very large amounts of a solid feed composition. For instance, the system is capable of uniformly dispersing only two pounds of solution per one ton of dry feed. In fact, it is believed that the system can operate at a coefficient of variation of from about 20 to about 25.

Further, the system illustrated in FIG. 14 is a completely closed system meaning that none of the ingredients are ever exposed to air. Thus, contaminants, such as microorganisms or dust, are prevented from being combined with the solution during application. Further, the solution can be protected from the air in order to prevent oxygen from reacting with the feed additive, particularly if the additive is an enzyme.

These and other modifications and variations to the present invention may be practiced by those of ordinary skill in the art without departing from the spirit and scope of the present invention. In addition, it should be understood that aspects of the various embodiments may be interchanged in whole or in part. Furthermore, those of ordinary skill in the art will appreciate that the foregoing description is by way of example only, and is not intended to limit the invention.

What is claimed is:

1. A system for applying at least one liquid feed additive to a feed composition comprising:

a liquid additive line;

a dilution agent line;

a first pressure control device located along said dilution agent line for maintaining a dilution agent at a substantially constant pressure within said dilution agent line;

a connecting device connecting said liquid additive line with said dilution agent line for combining said dilution agent with said liquid feed additive in order to form a feed solution;

a pump located along said liquid additive line, said pump for pumping said liquid feed additive to said connecting device for combining said liquid feed additive with said dilution agent;

a spray device in fluid communication with said connecting device, said spray device for spraying said feed solution onto a solid feed composition;

a controller in communication with said pump, wherein said controller is configured to control said pump so as to combine selected amounts of said liquid additive with said dilution agent; and a flow meter located along said liquid additive line for monitoring the flow rate of said liquid additive within said line, said flow meter sending flow rate information to said controller, wherein said controller is configured to receive information from said flow meter and, based on said information, to adjust said pump for combining predetermined amounts of said liquid feed additive with said dilution agent.

2. A system as defined in claim 1, further comprising a mixing device in downstream communication with said connecting device, said mixing device for mixing said feed solution.

3. A system as defined in claim 2, wherein said mixing device comprises a static mixer.

4. A system as defined in claim 1, further comprising a solid feed stream in communication with a solid feed measuring device for measuring the flow rate of a solid feed composition contained in said solid feed stream, said solid feed measuring device being in communication with said controller, said controller being configured to receive information from said solid feed measuring device and, based on said information, to control said pump for controlling the amount of said liquid feed additive that is combined with said dilution agent in response to flow rate fluctuations of said feed composition.

5. A system as defined in claim 4, wherein said solid feed measuring device comprises a mass flow meter.

6. A system as defined in claim 1, wherein said system includes a plurality of liquid feed additive lines, each of said feed additive lines being in fluid communication with said dilution agent line.

7. A system as defined in claim 1, wherein said connecting device is configured such that said liquid feed additive is only combined with said dilution agent when the pressure of said liquid feed additive within said liquid additive line is greater than the pressure of said dilution agent within said dilution agent line.

8. A system as defined in claim 1, further comprising a second pressure control device located along said liquid additive line for maintaining said liquid feed additive at a substantially constant pressure within said liquid additive line.

9. A system for applying at least one liquid feed additive to a feed composition comprising:

a liquid additive line;

a dilution agent line;

a connecting device connecting said liquid additive line with said dilution agent line for combining a dilution agent with a liquid feed additive in order to form a feed solution;

a pump located along said liquid additive line, said pump for pumping said liquid feed additive to said connecting device for combining said liquid feed additive with said dilution agent;

a flow meter located along said liquid additive line for monitoring the flow rate of said liquid additive;

a spray chamber for applying said feed solution onto a feed composition, said spray chamber including at least one spray device in fluid communication with said connecting device, said spray device for spraying said feed solution onto said solid feed composition;

a solid feed stream in communication with a solid feed measuring device for measuring the flow rate of a solid feed composition contained in said solid feed stream; and a controller in communication with said pump, said flow meter, and said solid feed measuring device, said controller being configured to receive information from said flow meter regarding the flow rate of said liquid feed additive and from said solid feed measuring device regarding the flow rate of a feed composition and wherein said controller, based on said information received from said flow meter and from said solid feed measuring device, is further configured to control said pump for applying predetermined amounts of said liquid feed additive onto said feed composition.

10. A system as defined in claim 9, wherein said controller comprises a microprocessor.

11. A system as defined in claim 9, wherein said solid feed measuring device comprises a mass flow meter.

12. A system as defined in claim 9, wherein said at least one spray device comprises a nozzle in communication with a pressurized gas supply, said nozzle being configured to combine said feed solution with a pressurized gas for spraying said feed solution onto said feed composition.

13. A system as defined in claim 9, wherein said system is configured to apply said liquid additive at a rate of about 0.1 pounds per hour to about 0.5 pounds per hour onto a feed composition having a mass flow rate of about 10 tons per hour to about 100 tons per hour.

14. A system for applying a liquid feed additive to a feed composition comprising:

a mixing tank;

a liquid additive line for supplying a liquid feed additive to said mixing tank;

a dilution agent line for supplying a dilution agent to said mixing tank;

at least one measuring device configured to measure the amount of a liquid additive and a dilution agent being fed to said mixing tank in forming a feed solution;

a dispensing tank in fluid communication with said mixing tank for receiving said feed solution therefrom, said dispensing tank also being in fluid communication with a recirculation conduit and an effluent;

a flow control device for selectively dispensing said feed solution from said dispensing tank into said recirculation conduit or said effluent; and a spray device in fluid communication with said effluent for applying said feed solution onto a feed composition.

15. A system as defined in claim 14, further comprising a pump in fluid communication with said dispensing tank for pumping said feed solution into said effluent or said recirculation conduit.

16. A system as defined in claim 15, further comprising a flow meter for monitoring the flow of said feed solution through said effluent.

17. A system as defined in claim 16, further comprising a controller in communication with said pump and said flow meter, said controller being configured to receive information from said flow meter and, based on said information, to adjust said pump for feeding a predetermined amount of said feed solution into said effluent.

18. A system as defined in claim 17, further comprising a solid feed measuring device for monitoring the flow rate of a solid feed composition, said solid feed measuring device being in communication with said controller, wherein said controller is configured to receive information from said solid feed measuring device and from said flow meter and, based on said information, to adjust said pump for applying a predetermined amount of said feed solution to said feed composition.

19. A system as defined in claim 14, wherein said circulation conduit circulates said feed solution to and from said dispensing tank.

20. A system for applying at least one liquid feed additive to a feed composition comprising:
    a liquid additive line;
    a dilution agent line;
    a first pressure control device located along said dilution agent line for maintaining a dilution agent at a substantially constant pressure within said dilution agent line;
    a connecting device connecting said liquid additive line with said dilution agent line for combining said dilution agent with said liquid feed additive in order to form a feed solution;
    a pump located along said liquid additive line, said pump for pumping said liquid feed additive to said connecting device for combining said liquid feed additive with said dilution agent;
    a spray device in fluid communication with said connecting device, said spray device for spraying said feed solution onto a solid feed composition;
    a controller in communication with said pump, wherein said controller is configured to control said pump so as to combine selected amounts of said liquid additive with said dilution agent; and
    a solid feed stream in communication with a solid feed measuring device for measuring the flow rate of a solid feed composition contained in said solid feed stream, said solid feed measuring device being in communication with said controller, said controller being configured to receive information from said solid feed measuring device and, based on said information, to control said pump for controlling the amount of said liquid feed additive that is combined with said dilution agent in response to flow rate fluctuations of said feed composition.

21. A system as defined in claim 20, wherein said solid feed measuring device comprises a mass flow meter.

22. A system as defined in claim 20, further comprising a flow meter located along said liquid additive line for monitoring the flow rate of said liquid additive within said line, said flow meter sending flow rate information to said controller, wherein said controller is configured to receive information from said flow meter and, based on said information, to adjust said pump for combining predetermined amounts of said liquid feed additive with said dilution agent.

23. A system as defined in claim 20, further comprising a mixing device in downstream communication with said connecting device, said mixing device for mixing said feed solution.

24. A system as defined in claim 23, wherein said mixing device comprises a static mixer.

25. A system as defined in claim 22, further comprising a second pressure control device located along said liquid additive line for maintaining said liquid feed additive at a substantially constant pressure within said liquid additive line.

26. A system as defined in claim 20, wherein said system includes a plurality of liquid feed additive lines, each of said feed additive lines being in fluid communication with said dilution agent line.

27. A system as defined in claim 20, wherein said connecting device is configured such that said liquid feed additive is only combined with said dilution agent when the pressure of said liquid feed additive within said liquid additive line is greater than the pressure of said dilution agent within said dilution agent line.

28. A system for applying at least one liquid feed additive to a feed composition comprising:
    a liquid additive line;
    a dilution agent line;
    a first pressure control device located along said dilution agent line for maintaining a dilution agent at a substantially constant pressure within said dilution agent line;
    a connecting device connecting said liquid additive line with said dilution agent line for combining said dilution agent with said liquid feed additive in order to form a feed solution, said connecting device being configured such that said liquid feed additive is only combined with said dilution agent when the pressure of said liquid feed additive within said liquid additive line is greater than the pressure of said dilution agent within said dilution agent line;
    a pump located along said liquid additive line, said pump for pumping said liquid feed additive to said connecting device for combining said liquid feed additive with said dilution agent;
    a spray device in fluid communication with said connecting device, said spray device for spraying said feed solution onto a solid feed composition; and
    a controller in communication with said pump, wherein said controller is configured to control said pump so as to combine selected amounts of said liquid additive with said dilution agent.

29. A system as defined in claim 28, further comprising a flow meter located along said liquid additive line for monitoring the flow rate of said liquid additive within said line, said flow meter sending flow rate information to said controller, wherein said controller is configured to receive information from said flow meter and, based on said information, to adjust said pump for combining predetermined amounts of said liquid feed additive with said dilution agent.

30. A system as defined in claim 28, further comprising a mixing device in downstream communication with said connecting device, said mixing device for mixing said feed solution.

31. A system as defined in claim 30, wherein said mixing device comprises a static mixer.

32. A system as defined in claim 29, further comprising a second pressure control device located along said liquid additive line for maintaining said liquid feed additive at a substantially constant pressure within said liquid additive line.

33. A system as defined in claim 28, further comprising a solid feed stream in communication with a solid feed measuring device for measuring the flow rate of a solid feed composition contained in said solid feed stream, said solid feed measuring device being in communication with said controller, said controller being configured to receive information from said solid feed measuring device and, based on said information, to control said pump for controlling the amount of said liquid feed additive that is combined with said dilution agent in response to flow rate fluctuations of said feed composition.

34. A system as defined in claim 33, wherein said solid feed measuring device comprises a mass flow meter.

35. A system as defined in claim 28, wherein said system includes a plurality of liquid feed additive lines, each of said feed additive lines being in fluid communication with said dilution agent line.

* * * * *